United States Patent
Milne et al.

(10) Patent No.: US 7,187,787 B2
(45) Date of Patent: Mar. 6, 2007

(54) METHOD AND APPARATUS FOR FACIAL IDENTIFICATION ENHANCEMENT

(75) Inventors: Donald A. Milne, Fairfax, VA (US); Tianlong Chen, Gaithersburg, MD (US); Yi Rui, Gaithersburg, MD (US); Yingbin Wang, Falls Church, VA (US); Jonathon Vu, Fairfax, VA (US); Yinong Wei, Gaithersburg, MD (US)

(73) Assignee: Intelitrac, Inc., Gaithersburg, MD (US)

( * ) Notice: Subject to any disclaimer, the term of this patent is extended or adjusted under 35 U.S.C. 154(b) by 742 days.

(21) Appl. No.: 10/635,565

(22) Filed: Aug. 7, 2003

(65) Prior Publication Data

US 2004/0181552 A1    Sep. 16, 2004

(51) Int. Cl.
*G06K 9/00* (2006.01)

(52) U.S. Cl. .................. 382/118; 382/118; 382/305; 340/5.82; 340/5.83; 704/245

(58) Field of Classification Search ............... 382/115, 382/118, 117, 181, 224, 228, 128, 226, 278, 382/305, 311; 348/77–78; 396/14, 15, 18; 902/1, 3, 5, 6; 340/5.82, 5.2, 5.83, 5.8; 713/182, 713/185, 168
See application file for complete search history.

(56) References Cited

U.S. PATENT DOCUMENTS

| 5,802,361 | A  | * | 9/1998 | Wang et al. ............. 382/217 |
| 6,122,042 | A  | * | 9/2000 | Wunderman et al. ...... 356/73 |
| 6,404,903 | B2 | * | 6/2002 | Okano et al. ............ 382/117 |
| 6,950,536 | B2 | * | 9/2005 | Houvener ................. 382/116 |
| 2002/0114522 | A1 | * | 8/2002 | Seeber ..................... 382/218 |
| 2003/0071908 | A1 | * | 4/2003 | Sannoh et al. ........... 348/345 |
| 2003/0123713 | A1 | * | 7/2003 | Geng ....................... 382/118 |

* cited by examiner

*Primary Examiner*—Sheela Chawan
(74) *Attorney, Agent, or Firm*—24IP Law Group USA; Timothy R. DeWitt

(57) ABSTRACT

A method and implementation of enhancing a facial recognition process to increase the judgment confidence on identifying a person from a large image database of multiple persons. The method may include reconstructing a database of 2D images having only a small number of images with respect to each person into a database having multiple images, perhaps hundreds or thousands, of each person. The multiple images represent different camera angles or different lighting conditions. The method further includes adding an extra confidence percentage to matching images in the database when multiple images of a person are identified as matching.

31 Claims, 1 Drawing Sheet

METHOD AND APPARATUS FOR FACIAL IDENTIFICATION ENHANCEMENT

CROSS-REFERENCE TO RELATED APPLICATIONS

Memory-Resident Database Management System and Implementation Thereof; Ser. No. 10/347,678; Filed on Jan. 22, 2003; Inventors: Tianlong Chen, Jonathan Vu.

Distributed Memory Computing Environment and Implementation Thereof; application Ser. No. 10/347,677, Filed on Jan. 22, 2003; Inventors: Tianlong Chen, Jonathan Vu, Yingbin Wang.

Invariant Memory Page Pool and Implementation Thereof; Application Ser. No. 10/425,730 Filed on Apr. 30, 2003; Inventors: Tianlong Chen, Yingbin Wang, Yinong Wei.

Central Linked List Data Structure and Methods of Use; Filed Jul. 9, 2002, Provisional Application Ser. No. 60/394,257; Inventor: Jonathan Vu.

A Method and or System to Perform Automated Facial Recognition and Comparison Using Multiple 2D Facial Images Parsed from a Captured 3D Facial Image;

Image Indexing Search and Implementation Thereof; U.S. Provisional Application No. 60/454,315 filed on Mar. 14, 2003; Inventors: Tianlong Chen, Yi Rui, Yingbin Wang, and Yinong Wei.

The entirety of each of the aforementioned patent applications is incorporated by reference herein.

STATEMENT REGARDING FEDERALLY SPONSORED RESEARCH OR DEVELOPMENT

Not applicable.

FIELD OF THE INVENTION

The present invention is related to a method and implementation of enhancing a facial recognition process to increase the judgment confidence on identifying a person from a large image database of multiple persons.

BACKGROUND OF THE INVENTION

In traditional facial identification processes of identifying one person from an image database of multiple persons in 2D facial recognition, a face photo of the person is compared (or called "matching") with all face photos in the database using a recognition algorithm or recognition software. The 2D facial recognition algorithm or software will generate a confidence percentage for each matching photo in the database on how much similarity the 2D facial recognition algorithm finds between the face photo of the person and the matching photo in the database. The match of the highest confidence percentage or several matches with top confidence percentages are returned for the operator to make a judgment as to whether there are matches.

Traditional 2D facial recognition algorithms, however, normally have problems identifying face photos because of a large number of variables, such as the lighting present at the time a particular photo is taken or the angle at which the photo is taken, with respect to the face photo being taken of the person and the face photos in the database. Other such variables would be apparent to those skilled in the art. These variables can cause the confidence percentages generated by the 2d facial recognition algorithm or software to be artificially low.

SUMMARY OF THE INVENTION

The present invention enhances the matching process by reconstructing an image database of multiple persons into one in which each person has multiple pictures representing different angles, lighting conditions and etc. Preferable, each person will have a similar or identical number of photos in the reconstructed database. The invention enhances the confidence percentage for a particular match based upon the number of matching photos found for a particular person. The present invention provides a method and implementation on how to construct and define such increased confidence over existing single-image-per-person facial recognition systems.

Still other aspects, features, and advantages of the present invention are readily apparent from the following detailed description, simply by illustrating preferable embodiments and implementations. The present invention is also capable of other and different embodiments, and its several details can be modified in various respects, all without departing from the spirit and scope of the present invention. Accordingly, the drawings and descriptions are to be regarded as illustration in nature, and not as restrictive.

BRIEF DESCRIPTION OF THE DRAWINGS

The accompanying drawings, which are incorporated in and constitute a part of this specification illustrate some embodiments of the invention and, together with the description, serve to explain the objects, advantages, and principles of the invention. In the drawings.

DESCRIPTION OF THE PREFERRED EMBODIMENT

Figure 1:
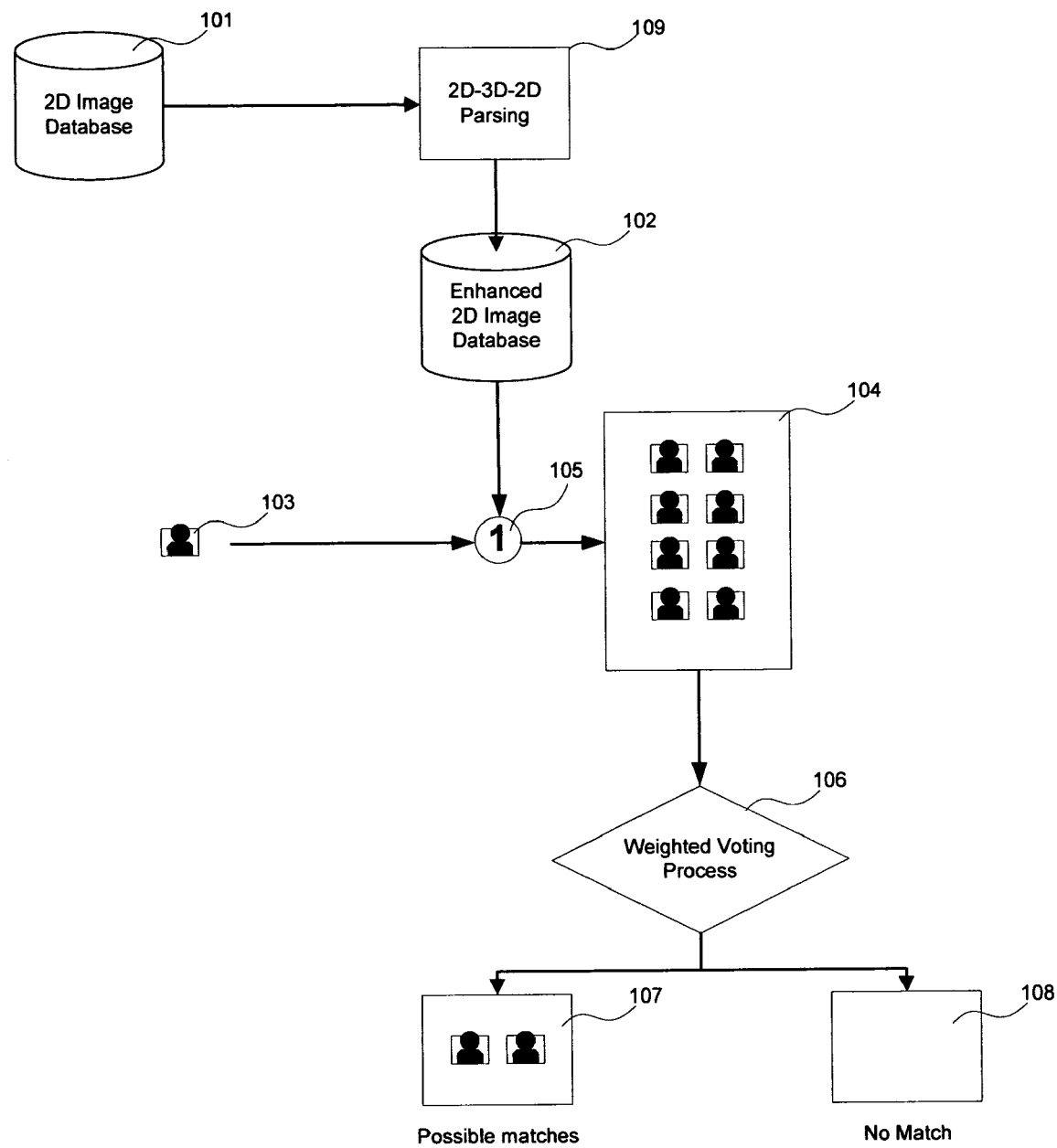
FIG. 1 illustrates a conceptual dataflow diagram of the enhanced facial recognition architecture in accordance with the present invention.

The enhanced facial recognition system and method of the present invention is built upon existing 2D facial recognition algorithms. The present invention relates to enhancement of a confidence level of an identity of a person from an image database of multiple persons, sometimes called a one-to-many identification process.

Referring to FIG. 1, normally each person in a 2D image database 101 has only one (frontal) or two (frontal and profile, i.e. 90 degree) 2D pictures in the database. Given such a limited database, a first step of the present invention is to reconstruct 109 the 2D image database 102 in such a way that each person will have same number or similar number (preferably the difference in number being less than ±5% of the average number There exists a technology that can generate a 3D module from a 2D frontal picture or from both a 2D frontal picture and a 2D profile picture of a person (Such as the software from CyberExtruder, http://www.cyberextruder.com/). This 2D to 3D processing is sometimes referred to as "2D–3D processing." The 3D module can be rotated and be added with different lighting and other parameters as one wishes. Such lighting parameters may include brightness, hue, contrast, the angle of lighting, and others. One also can save a 2D picture (sometimes called "parsed image" or "morphed image") from the generated 3D module at each orientation and lighting condition from the 3D module. Theoretically, one could generate a virtually infinite number of 2D pictures of a person with different orientation, lighting and other parameters. This 3D to 2D processing may be referred to as "3D–2D processing," "3D parsed to 2D processing," or "parsing a 3D image into multiple 2D images." The whole process of converting one or two 2D picture(s) of a person into a 3D module and then further generating multiple parsed 2D pictures of a person is sometimes referred as "2D–3D–2D processing." While the above represents one method of generating multiple pictures of a person for the reconstruction of a 2D image database, other methods may be used in connection with the present invention.

Referring to FIG. 1, using the above 2D–3D–2D processing technology, one can generate multiple 2D pictures with different orientations, different lighting conditions and other parameters from one or two 2D pictures of a person. Typically based on intended applications, one original image is to be parsed into 50 to 1000 parsed images. This provides a method 109 to reconstruct an original 2D image database 101 into an enhanced 2D image database 102. Further, rules may be set for the reconstruction. First, the number of pictures generated for each person preferably is set to be substantially same (or the difference in number is less than ±5% of the average number of pictures per person). Second, the orientation, lighting conditions and other parameter settings preferably are set to be substantially the same for all persons in the image database. Third, one original picture per person, i.e., the picture from which the multiple parsed images was generated and normally is a frontal picture, is included in the reconstructed database. These three rules provide for each person in the enhanced 2D image database 102 to be relatively equivalent. Other reconstruction rules, or a subset of these three rules, are, of course, possible and may be used with the present invention.

Still referring to FIG. 1, in a 2D image database having multiple pictures of each of multiple people (such as the reconstructed database), each image in the 2D image database 102 may be digitized into a template to be used by a 2D facial recognition matching algorithm for one-to-one comparison with a photo taken of a person. At this point, each person in the enhanced image database 102 has multiple parsed images (including original image) and multiple templates (one template per each parsed image and the original image). Since only templates are used in 2D facial matching algorithm, and there is no need to display a large number of images of the same person to an operator when matches are found, all but one or a few of the multiple parsed images can optionally be removed after their templates are generated in order to save storage space. Typically, the original frontal image would be kept for display to an operator in the event of a match for a particular person in the database. Each person in the enhanced 2D image database 102 has one group of templates, and every template in a person's group is assigned with same group ID.

Referring to FIG.1, the present invention shows an enhanced judgment process (105, 104, 106, 107, and 108) based on newly reconstructed 2D image database 102.

Still referring to FIG. 1, the process starts from one incoming target image 103, and the goal is to find matches which have above a pre-selected confidence threshold, say PS1 in percentage (%), from the enhanced 2D image database 102.

Still referring to FIG. 1, the present process starts by finding 105 matches of the incoming target image 103 from the enhanced 2D image database 102, and the matches should have over a second pre-selected confidence threshold, say PS2 in percentage (%) (PS2 is also called "qualification percentage"), and choose a number N2 (called "qualification candidate number") of top matches from the matches to form a group, called voting group 104. And typically choose PS2<=PS1, and N2 ideally be no limit. If N2 being unlimited results in too many matches and therefore a slow speed, N2 is typically chosen to be the number of morphed images each person has, which is in 100s or 1000s. In the well-constrained environments in which the incoming target image is known to be within certain angle and lighting conditions, then the number of morphed images can be configured to be much less.

Still referring to FIG. 1, it is possible that one person has multiple matches in the voting group 104, and it is often the case in real world. And normally each match can have different matching confidence percentage.

Another possibility is no match above PS2. Therefore, there will be no match above PS1 (>=PS2) either, and the final judgment or result is no match in such a case. procedure is that if multiple judges say he is the target, it will be more confident than one judge says he is the target.

Still referring to FIG. 1, based on the above design philosophy, there are many ways to implement the procedure 106 (called voting procedure). Here shows one possible way. Let us assume that there are N number of matches to the incoming target in the voting group 104, and those matches correspond to L number of persons, each person has, respectively, $p_1, p_2, p_3 \ldots p_L$ number of matches, and $p_1+p_2+p_3+ \ldots +p_L=N$, and L<=N, and each person has its maximum match value, respectively, m1, m2, m3, ... mL in the voting group 104. And choose a percentage number X that is the maximum extra confidence percentage added above the regular confidence percentage number from the 2D facial matching algorithm. X is typically chosen to be 10 to 20 (%). Then each person in the voting group 104 will have the final match confidence percentage, respectively, $(m_1+p_1/N*X)$, $(m_2+p_2/N*X)$, ... $(m_L+p_L/N*X)$. Another way to determine the final match confidence percentage is to choose the maximum value of each person in the voting group m1, m2, m3, ... mL, respectively, as the final match confidence percentage for each person in the voting group. If the final match percentage value is over 100, set to be 100. By the way, the match percentage value is between 0 and 100 including 0 and 100.

Still referring to FIG. 1, then each person in the voting group 104 will have one single final match percentage value. Choose those persons whose final match percentage value is over PS2 for final output 107, 108 if any, and display the result in sorted order.

The foregoing description of the preferred embodiments of the invention has been presented for purposes of illustration and description. It is not intended to be exhaustive are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method of finding up to a pre-set number of database images each having at least a pre-set confidence percentage that said database image matches a target facial image, comprising the steps of:

reconstructing a first 2D facial image database into a second 2D facial image database, said first 2D facial image database having a first facial image for a person, said second 2D facial image database having a plurality of parsed facial images for said person;

choosing a qualification percentage no greater than said pre-set confidence percentage;

choosing a qualification candidate number;

creating a voting group of people corresponding to parsed images from said second 2D facial image database by finding up to said qualification candidate number of highest matches of said target facial image using a 2D facial recognition algorithm;

generating a combined matching confidence percentage for each person in said voting group;

creating a final match list for said target facial image by selecting up to said pre-set number of highest matches from said voting group said combined matching confidence percentage for each person in said voting group.

2. A method according to claim 1 wherein said reconstructing step, comprising the steps of:

generating a 3D module from one or more images of a person in said first 2D facial image database;

generating a plurality of parsed 2D images from said 3D module of said each person in said first 2D facial image database.

3. A method according to claim 2 wherein said plurality of parsed 2D images comprises at least one hundred images.

4. A method according to claim 2 wherein said generating parsed 2D images step comprises the steps of:

rotating said 3D module to one or more different angles; and saving a plurality of 2D images corresponding to said one or more different angles.

5. A method according to claim 2 wherein said generating parsed 2D images step comprises the steps of:

selecting one or more different angles based upon known angles of said target image;

rotating said 3D module to said one or more different angles; and saving a plurality of 2D images corresponding to said one or more different angles.

6. A method according to claim 2 wherein said generating parsed 2D images step comprises the steps of:

changing the lighting for said 3D module to a plurality of lighting settings; and saving a plurality of 2D images corresponding to said lighting settings.

7. A method according to claim 6 wherein said step of changing the lighting comprises changing the lighting strength.

8. A method according to claim 6 wherein said step of changing the lighting comprises changing the lighting colors.

9. A method according to claim 6 wherein said step of changing the lighting comprises changing the lighting brightness.

10. A method according to claim 6 wherein said step of changing the lighting comprises changing the lighting hue.

11. A method according to claim 2 wherein said generating parsed 2D images step comprises the steps of:

selecting a plurality of lighting settings based upon one or more known lighting settings of said target image;

changing the lighting for said 3D module to said plurality of lighting settings; and saving a plurality of 2D images corresponding to said lighting settings.

12. A method according to claim 1 wherein said reconstructing step comprises the steps of:

generating said parsed images by rotating a 2D image of a person in said first 2D facial image database, and further saving as 2D images.

13. A method according to claim 1 wherein said second 2D facial image database comprises an identical number of parsed images for each person.

14. A method according to claim 1 wherein said second 2D facial image database comprises a similar number of parsed images for each person.

15. A method according to claim 14 wherein the number of parsed images for each person in said second 2D facial image database are within plus or minus five percent.

16. A method according to claim 1 wherein said qualification candidate number is chosen as an average number of parsed images per person in said second 2D facial image database.

17. A method according to claim 1 further comprising the step of assigning an ID to a plurality of images in said second 2D database corresponding to a single person.

18. A method according to claim 17 further comprising the step of digitizing said plurality of parsed images of said single person into templates.

19. A method according to claim 18 further comprising the step of assigning said ID to said templates.

20. A method according to claim 19 wherein said matches with same ID in said voting group belong to a same person.

21. A method according to claim 19 wherein said combined matching confidence percentage of a person is generated from said matches with same ID of said person.

22. A method according to claim 18 further comprising the step of digitizing said first facial image of said person into a template.

23. A method according to claim 22 further comprising the step of assigning said ID to said templates of said parsed images and to said template of said first facial image of said person.

24. A method according to claim 23, further comprising the step of removing said plurality of parsed images from said second 2D facial image database.

25. A method according to claim 18 wherein said step of creating a voting group of people corresponding parsed images from said second 2D facial image database by finding up to said qualification candidate number of highest matches of said target facial image using a 2D facial recognition algorithm is performed based upon said templates.

26. A method according to claim 1 wherein only said first facial image of a person is listed in said final match list.

27. A method according to claim 1 wherein an extra confidence percentage is chosen for determining said combined matching confidence percentage of a person.

28. A method according to claim 1 wherein said combined confidence percentage of a person in said voting group is determined as the maximum percentage of said person in said voting group plus the number of matches of said person in voting group divided by the said qualification candidate number times the said extra confidence percentage.

29. A method according to claim 1 wherein said combined confidence percentage of a person is set to 100 if said combined confidence percentage is greater than 100.

30. A method according to claim 1 wherein the number of matches in said final match list is zero if the number of said voting group is zero.

31. A method according to claim 1 wherein said combined confidence percentage of a person in said voting group is determined as the maximum percentage of said person in said voting group.

* * * * *